March 17, 1942.  M. A. OLGIATI  2,276,545
AUTOMATIC BREAD DOUGH AND LOAF PREPARING AND GRADUATING MACHINE
Filed Sept. 23, 1940  6 Sheets-Sheet 1
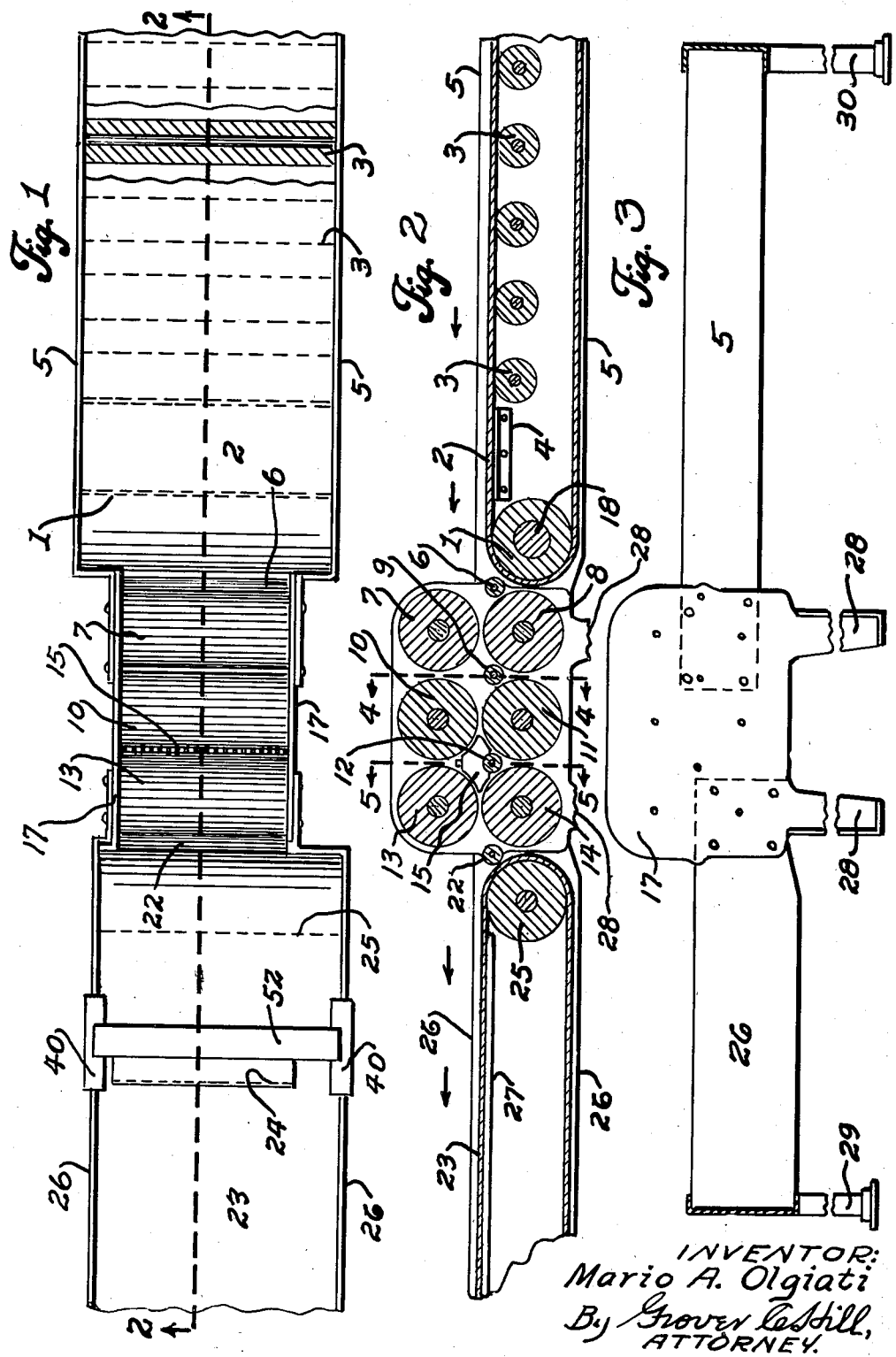
INVENTOR:
Mario A. Olgiati
By Grover Cahill,
ATTORNEY.

March 17, 1942. M. A. OLGIATI 2,276,545
AUTOMATIC BREAD DOUGH AND LOAF PREPARING AND GRADUATING MACHINE
Filed Sept. 23, 1940 6 Sheets-Sheet 2
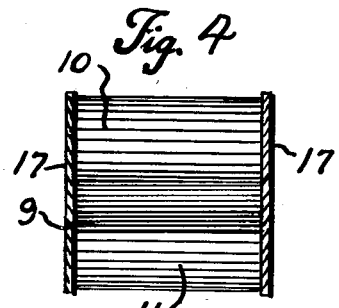
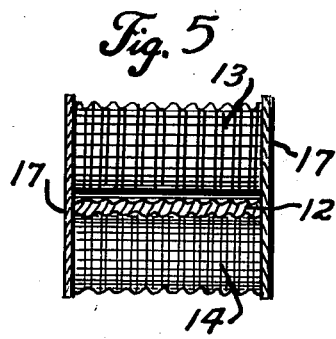
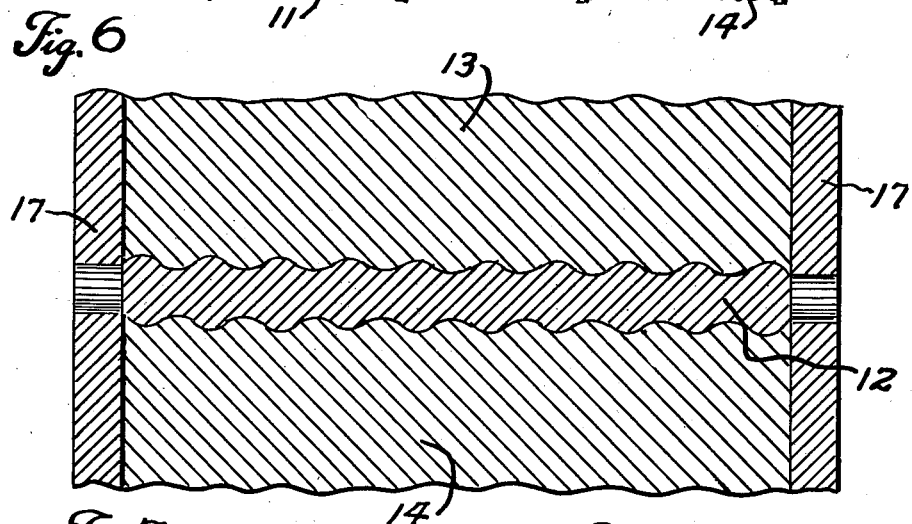
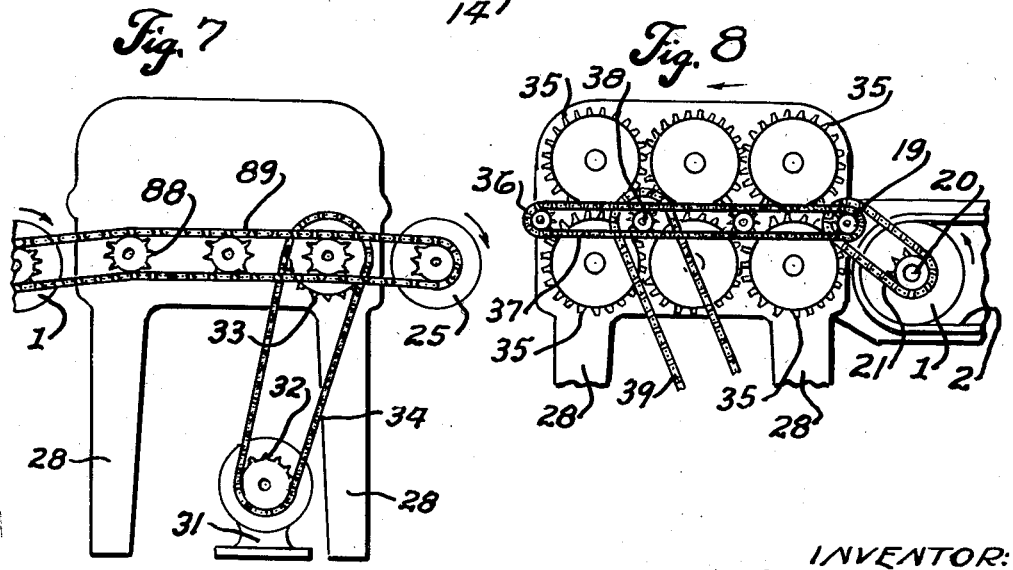
INVENTOR:
Mario A. Olgiati.
By Grover C. Hill,
ATTORNEY.

March 17, 1942.   M. A. OLGIATI   2,276,545
AUTOMATIC BREAD DOUGH AND LOAF PREPARING AND GRADUATING MACHINE
Filed Sept. 23, 1940   6 Sheets-Sheet 3
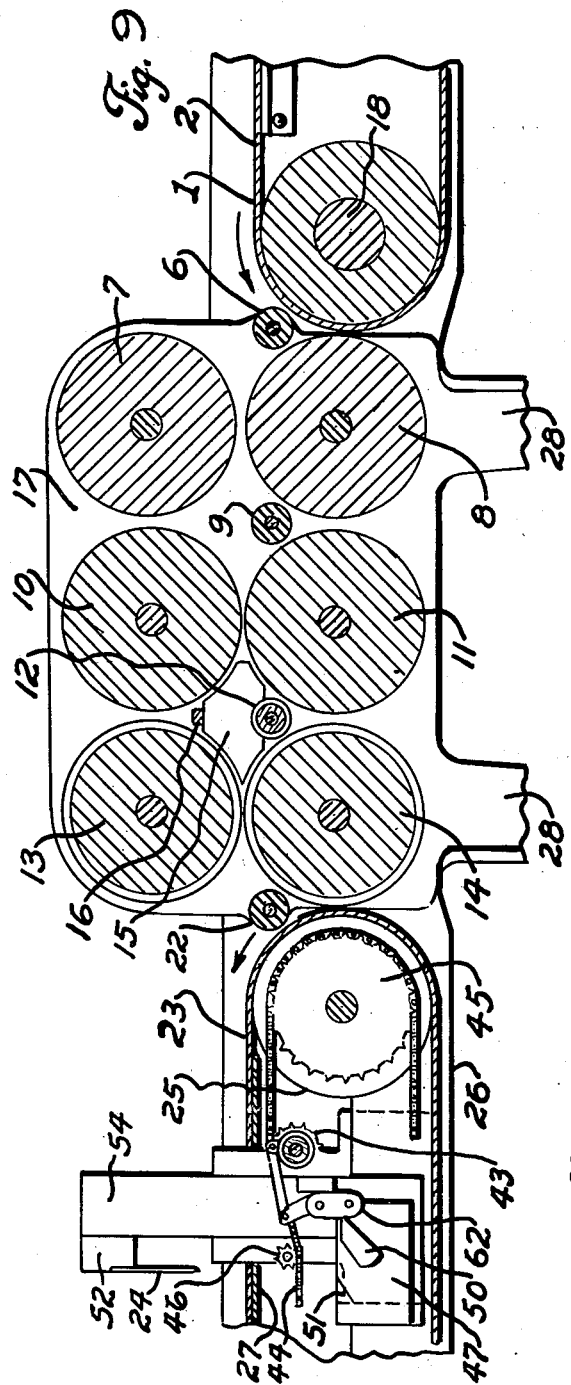
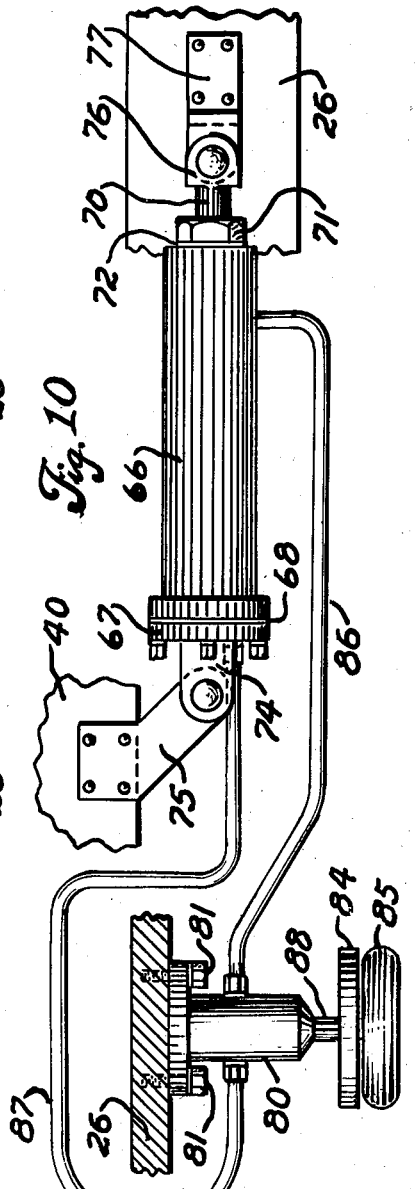
INVENTOR:
Mario A. Olgiati.
By Grover C. Hill,
ATTORNEY.

March 17, 1942. M. A. OLGIATI 2,276,545
AUTOMATIC BREAD DOUGH AND LOAF PREPARING AND GRADUATING MACHINE
Filed Sept. 23, 1940 6 Sheets-Sheet 4
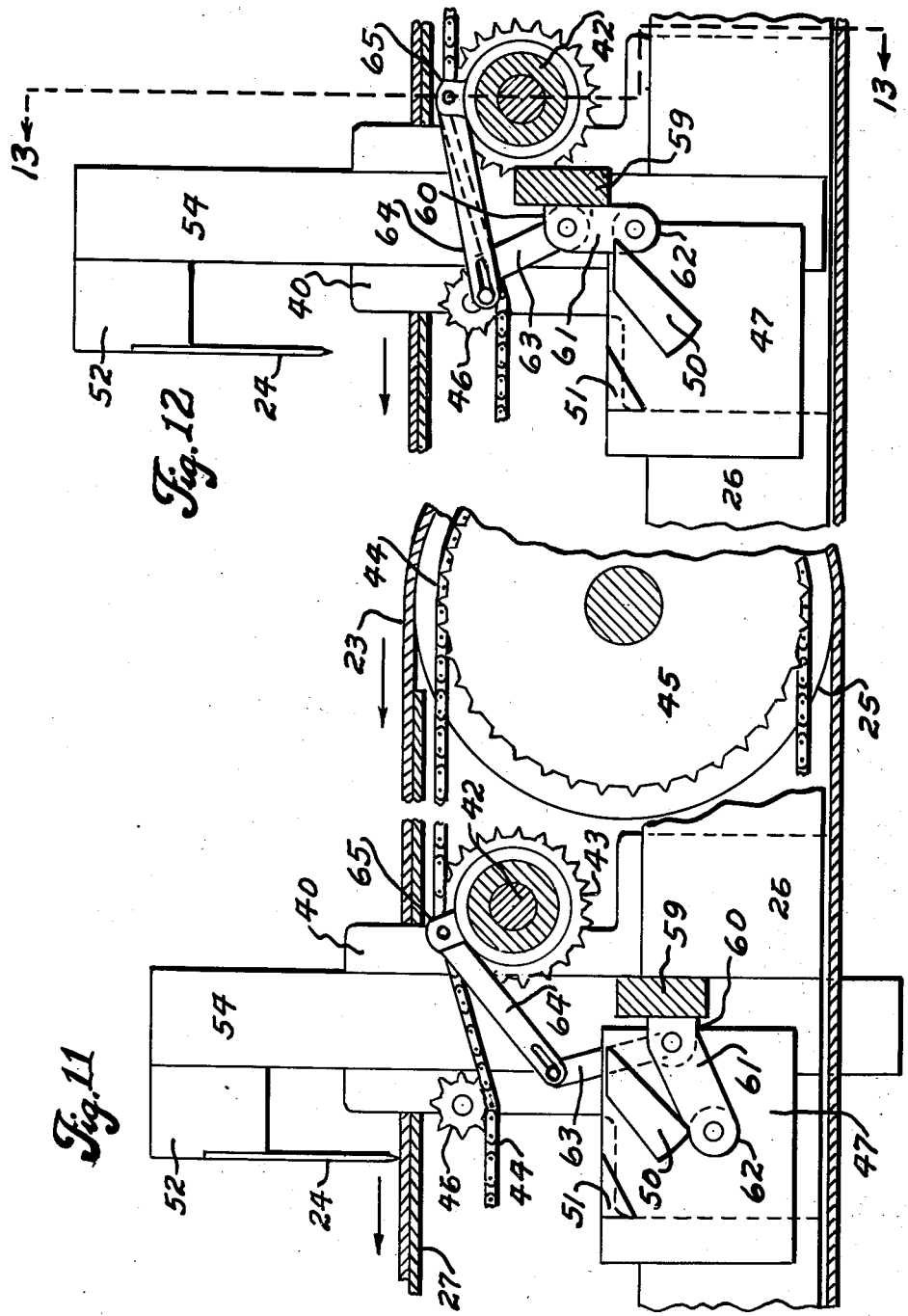
INVENTOR:
Mario A. Olgiati.
By Grover C. Hill,
ATTORNEY.

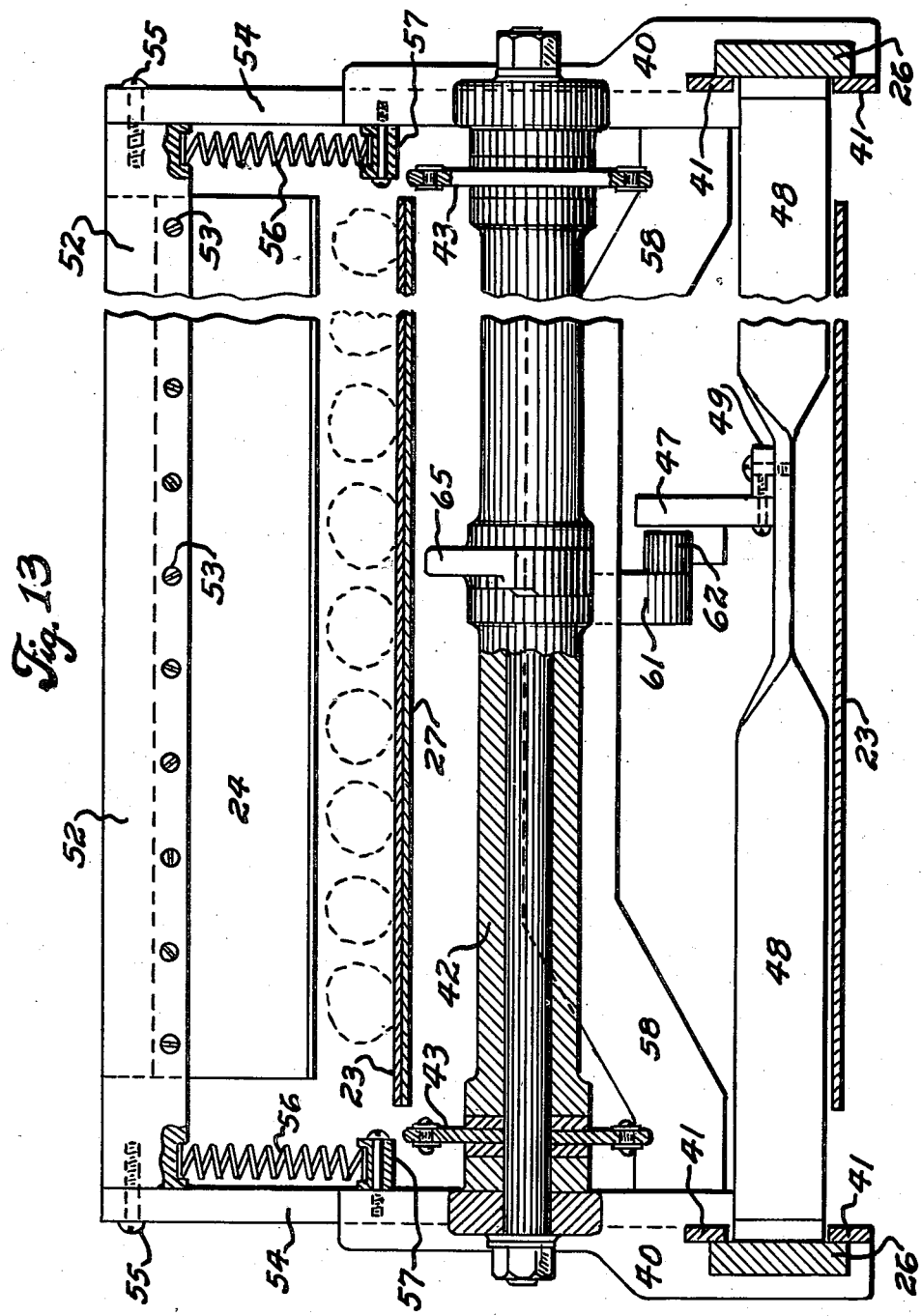

March 17, 1942. M. A. OLGIATI 2,276,545
AUTOMATIC BREAD DOUGH AND LOAF PREPARING AND GRADUATING MACHINE
Filed Sept. 23, 1940 6 Sheets—Sheet 6
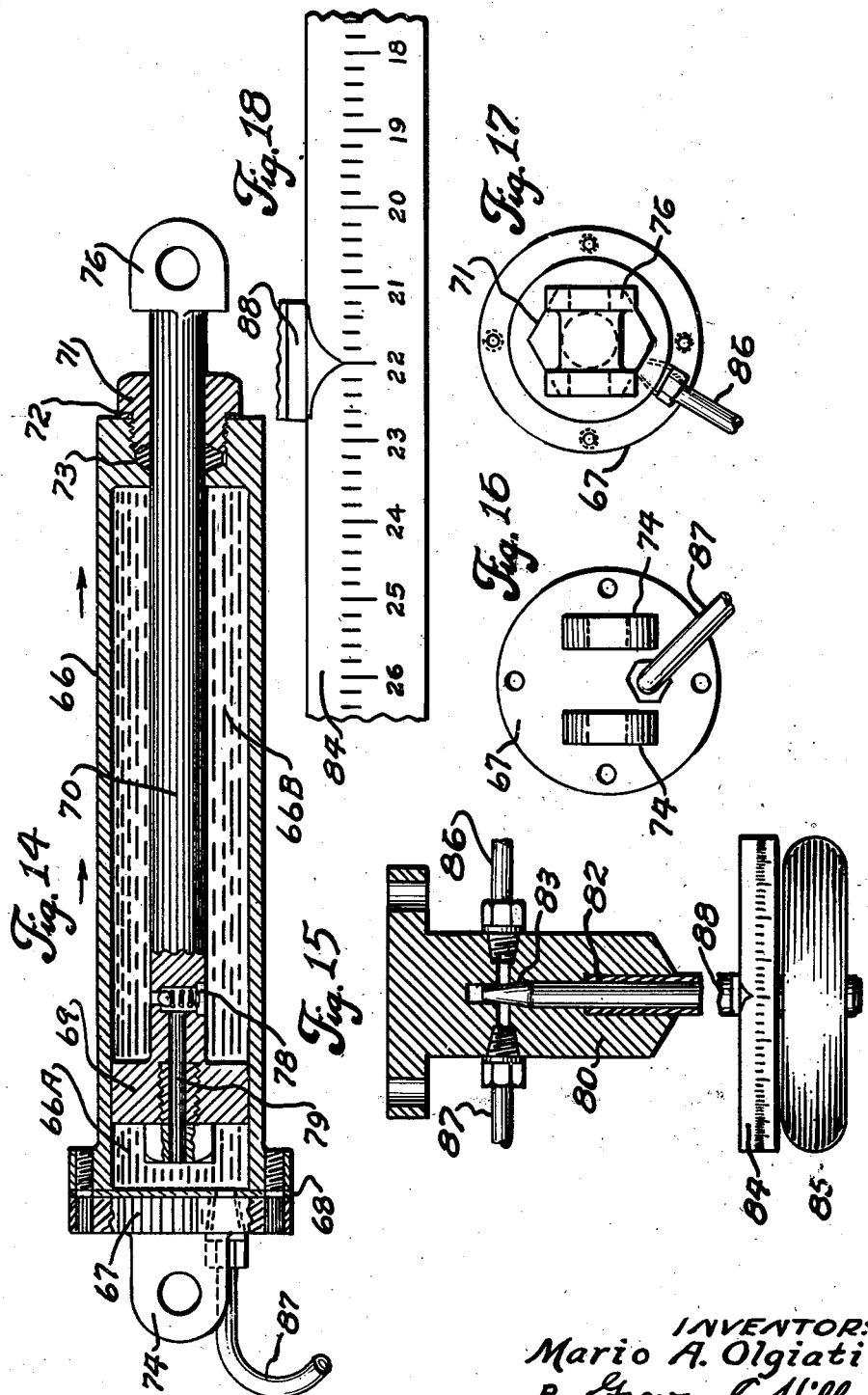
INVENTOR:
Mario A. Olgiati
By Grover L. Hill,
ATTORNEY.

Patented Mar. 17, 1942

2,276,545

UNITED STATES PATENT OFFICE 2,276,545

AUTOMATIC BREAD DOUGH AND LOAF PREPARING AND GRADUATING MACHINE

Mario A. Olgiati, Detroit, Mich.

Application September 23, 1940, Serial No. 357,914

2 Claims. (Cl. 107—21)

The present invention relates to improvements in the art of preparing bread dough preparatory to the baking of the same into loaves of various sizes and proportion, and provides a complete machine of this character that is entirely automatic in its operation.

One of the objects of the invention is that in preparing the bread dough to be baked into loaves, supreme accuracy of the weight of each loaf is effected by an adjustment capable of providing quantities of the dough to the fractional part of an ounce. In this manner all possible waste is thereby completely eliminated, hence the advantage of the machine from an efficient and economical viewpoint is readily acknowledged.

With the foregoing in mind, it will become readily apparent that the invention possesses further advantages, all of which will be clearly revealed during the course of the following detailed description, illustrated throughout the accompanying drawings, and more fully pointed out in the appended claims.

With reference to the drawings:

Figure 1 is a top plan view of the complete machine with portions thereof broken as indicated; the sprocket and gear mechanism being omitted.

Figure 2 is a longitudinal section taken upon line 2—2 of Figure 1, with the knife mechanism eliminated.

Figure 3 is a side elevation of the machine with knife, sprocket and gear mechanism omitted.

Figure 4 is a transverse section taken upon line 4—4 of Figure 2.

Figure 5 is also a transverse section, but taken upon line 5—5 of Figure 2.

Figure 6 is a superenlarged transverse section of the small forming roll and a portion of the large forming rolls.

Figure 7 is a partial side elevation of the machine showing how the large rolls are powered.

Figure 8 is a partial side elevation of the machine showing how the small rolls are powered, also the geared relation of the large rolls to each other.

Figure 9 is an enlarged partial longitudinal section of the machine showing the arrangement of all rolls, also the knife mechanism.

Figure 10 is an enlarged plan assembly of the hydraulic control for the knife mechanism.

Figure 11 is a superenlarged view of the knife mechanism showing the knife thereof in the act of cutting the dough.

Figure 12 is a similar view to Figure 11, but showing the knife in an upward dough clearing position.

Figure 13 is a superenlarged transverse section of the knife mechanism taken upon line 13—13 of Figure 12.

Figures 14 to 18 inclusive are enlarged views of the hydraulic control for the knife mechanism; and Figure 14 is a longitudinal section of the cylinder assembly and taken through the center thereof.

Figure 15 is a sectional assembly of the valve and indicating dial therefor.

Figure 16 is a front end elevation of the cylinder; and Figure 17 is a rear end elevation of the same.

Figure 18 is a superenlarged portion of the dial being upon a flat plane and showing the graduation thereof.

In carrying out the details and operation of the invention and referring more particularly to Figure 9, the same comprises two large smooth rolls 1, one of which is not shown, said rolls carry flexible belt 2, and in Figure 2 it is seen that said belt is adequately supported by a series of small rolls 3, the belt is also supported by plate 4 underneath the same and where indicated. Rolls 1 and 3 are journaled within side rail 5.

The dough is taken from the dough breaker and placed upon belt 2 which is now in motion, then carried over small roll 6 and continues in the direction of the arrows (Figure 2) and drawn between large rolls 7 and 8, roll 7 being vertically adjustable so that the thickness of the dough passing between rolls 7 and 8 may be controlled. The adjustment of roll 7 may be accomplished in any approved manner, but is not shown in the drawings.

The dough then passes over and is carried by small roll 9 and passes between cutting rolls 10 and 11, which cuts the same into strips of equal width, then passing over and carried by small forming roll 12, and further is carried between large forming rolls 13 and 14. Forming rolls 12, 13 and 14 are clearly shown in Figure 6, however the details of cutting rolls 10 and 11 are not shown in the drawings, and may be constructed in any approved manner. As the dough is carried over roll 12 the strips are uniformly separated by partitions 15, said partitions are supported by transversely extending bar 16 where shown, said bar is secured to both of side frames 17.

Rolls 6, 7, 8, 9, 10, 11, 12, 13 and 14 are journaled within side frames 17, and these bearings being of the oil-less type so as to eliminate any possibility of oil coming in contact with the dough.

As the dough upon belt 2 is fed to rolls 7 and 8 it may be somewhat congested at this point, and if this condition occurs, a free-wheeling mechanism is arranged in roll 1 as at 13, and said roll is connected to roll 6 by sprockets 19 and 20 and also chain 21 (Figure 8) so that roll 6 will instantly stop until the dough can be manually arranged and then again normally fed over roll 6 which will start to function properly.

After the dough is formed into strips the same are carried over and by small roll 22 and upon belt 23 to a predetermined position upon said belt to be cut off by knife 24 and are then removed from said belt and twisted together so as to form the kind of loaf desired. A representation of the dough strips may be found in dotted lines in Figure 13.

The operator handling this part of the work takes care of the adjustment of the speed of the machine, which may be done in any approved manner but not shown in the drawings.

Belt 23 is carried upon a pair of rolls 25, one of which is omitted from the drawings and is operated by sprockets 88 and chain 89 (Figure 7) and belt 2 being likewise operated by said sprockets and chain. Rolls 25 are journaled within side rails 26.

Side rails 5 and 26 are secured to side frames 17 respectively. Belt 23 is also supported by plate 27 which is disposed beneath the same.

In Figure 3 it is seen that side frames 17 are supported by legs 28. The outer end of rail 26 is supported by leg 29, and rail 5 is likewise supported by leg 30.

In Figure 7 it is seen that rolls 7, 8, 10, 11, 13 and 14 are powered by electric motor 31 through sprockets 32 and 33 and chain 34, and in Figure 8, each of said rolls has gear 35 secured to its shaft, gears 7 and 8 being geared together, rolls 10 and 11 in one unit, and rolls 13 and 14 in another unit.

Rolls 1, 9, 12, 22 and 25 are connected together by sprockets 36, one of which is secured to the shaft of each of said rolls, also chain 37 connecting all of said sprockets. The opposite end of motor 31 has sprocket (not shown) connecting sprocket 38 by chain 39 to roll 12. In this manner all rolls will rotate in the direction of the arrows simultaneously.

The exact length of the dough strips passing out upon belt 23 is governed by vertically actuating knife 24, and is accomplished by a certain mechanism as follows:

Referring more particularly to Figures 1, 11, 12 and 13, a pair of side frame members 40 is provided and are adapted to freely slide upon rails 26 with guide rails 41 where shown. A suitable disc plate clutch 42 is provided and has sprockets 43 thereon which are driven by chain 44, said chain engaging sprockets 45 being integral with rolls 25, and idle sprockets 46 being connected to side frame members 40 respectively, so as to keep chain 44 in engagement with sprockets 43 at all times.

Blocks 47 are secured to cross member 48 with small block 49 where shown. Blocks 47 have cam 50 and stop lug 51 thereon. Knife 24 is secured to cross member 52 by screws 53, said members being secured to vertically disposed bars 54 by screws 55. Bars 54 are adapted to slide freely within the respective side frame members 40, and referring now more particularly to Figure 13, knife 24 is constantly under pressure of coil springs 56 which return the knife to its upward clearing position. The upper end of springs 56 are pocketed within cross member 52, and the lower end thereof is received into sockets 57, said sockets being secured to side frame members 40 as indicated. Cross member 58 is provided and is secured to side frame members 40 so as to reinforce said members.

Transverse bar 59 is secured to vertical bars 54 and has bracket 60 thereon so as to accommodate link 61 which has roller 62 thereon. Lever 63 is pivoted to bracket 60 and also has pivotal connection with link 64, said link being pivoted to clutch 42 as at 65.

In Figure 12 knife 24 is at its topmost position in relation to belt 23, and clutch 42 being engaged thereby locking sprockets 43 therewith. As roll 25 is rotated sprockets 43 will pull the entire knife unit as previously described and in the direction of the arrows, or in other words said knife will move along at the same speed as the dough strips upon belt 23 until it reaches a predetermined distance thereupon, and the pressure exerted upon sprockets 43 causes bar 59 and roller 62 to descend upon cam 50 and when said roller is in lowermost position on said cam as in Figure 11, knife 24 is at its lowermost cutting position as shown, simultaneous with this action lever 63 through link 64 pulls portion 65 of the clutch thereby disengaging said clutch leaving sprockets 43 free, thus allowing the knife unit to return to normal position as in Figure 12.

The precise distance knife 24 will travel in its forward stroke and the speed in which it will travel upon its return stroke is governed by hydraulic control as follows:

Referring to Figures 10, 14, 15, 16, 17 and 18, cylinder 66 is provided and which is adapted to contain a suitable oil, and has detachably engaged cap 67 with gasket 68, and within said cylinder is piston 69 secured to stem 70, also nut 71, gasket 72 and packing ring 73 where shown. Cap 67 has bracket 74 thereon and is secured to one of side frame members 40 by arm 75. Bracket 76 as a part of stem 70 is secured to stationary side rail 26 by arm 77.

As piston 69 moves in the direction of the arrows (Figure 14) the oil is forced through ball valve 78 and through passage 79 into portion 66A of cylinder 66.

Control valve 80 is provided and is secured to the left of rails 29 by screws 81, said valve has stem 82 with conical end 83 thereon, and said stem is connected to dial 84, said dial is secured to manually operated wheel 85, also dial indicator 86 where shown.

In Figure 18, a large view of a portion of dial 84 is shown and is upon a flat plane. It is now understood that when dial 84 is backed out, in this proportion the oil is allowed to return from portion 66A of cylinder 66 to portion 66B of the same and through pipe 86, and the oil from portion 66A passes to valve 80 through pipe 87.

Inasmuch as cylinder 66 is connected to the knife mechanism unit, and that stem 70 is secured to a stationary object upon the machine, said hydraulic unit will automatically return the knife mechanism to normal position.

The distance the knife must travel according to the size of the loaf desired, is controlled by the speed of its return. For example, for long strips or larger loaves the knife must return more slowly, thus allowing more dough to pass through, whereas for shorter lengths of the dough strips, the knife must return to normal position more speedily.

Pipes 86 and 87 are of the flexible type to compensate for the movement of the knife mechanism.

The speed of the travel of knife 24 is governed by the speed the oil is allowed to flow through valve 80 and cylinder 66.

In conclusion, let it be understood that the complete disclosure herewith is merely illustrative of the general principle of the invention sought to be protected by Letters Patent, and that any contemplated changes made therein during any probable further development for the market, would fall directly within the scope of the claims.

Having thus fully described my invention, what I claim as new is:

1. In a machine of the character described, a pair of side frame members supported by vertical legs, a movable belt adapted to receive finished bread dough strips from the machine, a knife mechanism for cutting said strips to a predetermined length, said mechanism comprising a transversely extending knife over said belt, a pair of vertical bars and a cross member secured to said bars and means for securing the knife to said cross member, a pair of side frame members, said bars adapted to slidably engage said side frame members and extend vertically thereof, a pair of spaced apart horizontal rails and means for securing the same to the first-named side frame members, the last-named side frame members adapted to freely slide upon said horizontal rails, a pair of rolls to carry the aforesaid belt, a large sprocket fixed with the shaft of each of said rolls and a chain connecting said sprockets to each other, a clutch extending transversely of said belt and being connected to the last-named side frame members, small sprockets connected to said clutch and engaging the aforesaid chain, idle sprockets for keeping said chain in constant engagement with the clutch sprockets; means for disengaging said clutch at the end of the forward stroke of said knife for the return stroke thereof, coacting means for re-engaging the clutch for a repeated forward stroke of the knife, further coacting means whereby said knife will drop to a cutting position, and spring means for causing the knife to be elevated to the top clearing position.

2. In a machine of the character described, a movable belt to receive the finished bread dough strips, a knife transversely of said belt and being under constant spring pressure, a pair of spaced horizontal rails, a pair of side frame members adapted to slide upon said rails, a pair of bars vertically slidable within said side frame members, a cross member secured to said vertical bars and means for securing said knife to the cross member, spring means whereby the knife is constantly under pressure thereof relative to the side frame members and the cross member, said belt carried by a series of rolls and a large sprocket secured to the shaft of each of said rolls, a clutch secured to each of the side frame members, smaller sprockets upon said clutch, a chain connecting all of the belt roll sprockets and engaging said clutch sprockets and means for keeping the chain in engagement therewith, a cross member connected to said side frame members, a block vertically secured to the last-named cross member, a cross member secured to the aforesaid vertical bars, a link pivoted to said cross rail, a roller upon the end of said link, a cam integral with the aforesaid block, also a stop lug thereupon, when the aforesaid knife reaches the limit of its forward stroke the pressure of said chain causing said roller to follow around the cam simultaneously pulling downwardly the knife upon the belt for cutting the dough strips, coacting levers between said cross rail and clutch simultaneously disengaging the clutch and rendering the clutch sprockets free so that the knife may return to normal position; manually adjustable means for governing the length of the forward travel of said knife and the speed in which it returns to normal position.

MARIO A. OLGIATI.